(12) United States Patent
Thomas et al.

(10) Patent No.: US 8,474,342 B2
(45) Date of Patent: Jul. 2, 2013

(54) TRANSMISSION HAVING A LOW LAUNCH GEAR

(75) Inventors: Steven G. Thomas, Bloomfield Hills, MI (US); Steven A. Frait, Milan, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 12/824,347

(22) Filed: Jun. 28, 2010

(65) Prior Publication Data

US 2011/0314962 A1    Dec. 29, 2011

(51) Int. Cl.
*F16H 3/08* (2006.01)

(52) U.S. Cl.
USPC .......................................... 74/331

(58) Field of Classification Search
USPC . 74/606 R, 331, 330, 329, 325, 640; 475/211
See application file for complete search history.

(56) References Cited

U.S. PATENT DOCUMENTS

| | | |
|---|---|---|
| 4,584,891 A | 4/1986 | Mori |
| 5,044,215 A | 9/1991 | Watanabe |
| 5,390,560 A | 2/1995 | Ordo |
| 5,564,997 A * | 10/1996 | Janson et al. ................. 475/207 |
| 6,655,226 B2 * | 12/2003 | Oguri .............................. 74/333 |
| 6,886,424 B2 * | 5/2005 | Janson et al. .................. 74/329 |
| 6,958,028 B2 * | 10/2005 | Janson et al. ................. 475/207 |
| 6,990,871 B2 * | 1/2006 | Ebenhoch ......................... 74/74 |
| 7,080,566 B2 * | 7/2006 | Baldwin et al. ................ 74/331 |
| 7,083,540 B2 * | 8/2006 | Janson et al. ................. 475/211 |
| 7,124,659 B2 * | 10/2006 | Gumpoltsberger et al. .... 74/331 |
| 7,171,867 B2 | 2/2007 | McCrary et al. |
| 7,340,973 B2 * | 3/2008 | Hiraiwa .......................... 74/330 |
| 7,469,609 B2 * | 12/2008 | Baldwin ......................... 74/330 |
| 7,604,561 B2 * | 10/2009 | Earhart .......................... 475/218 |
| 8,151,662 B2 * | 4/2012 | Fitzgerald et al. .............. 74/330 |
| 8,156,836 B2 * | 4/2012 | Remmler et al. ............... 74/331 |
| 8,205,516 B2 * | 6/2012 | Kobayashi et al. ............ 74/331 |
| 2007/0149344 A1 | 6/2007 | McGrath et al. |
| 2008/0202266 A1 * | 8/2008 | Hendrickson et al. .......... 74/331 |
| 2008/0202267 A1 * | 8/2008 | Hendrickson et al. .......... 74/331 |
| 2008/0245166 A1 * | 10/2008 | Baldwin ......................... 74/331 |
| 2011/0314939 A1 * | 12/2011 | Thomas et al. ................ 74/331 |
| 2011/0314962 A1 * | 12/2011 | Thomas et al. ............. 74/665 F |

* cited by examiner

*Primary Examiner* — Troy Chambers
*Assistant Examiner* — Alexander Vu
(74) *Attorney, Agent, or Firm* — James Dottavio; MacMillan, Sobanski & Todd, LLC

(57) ABSTRACT

Gearing for a vehicle transmission includes meshing forward gears and an idler, a reverse gear engaging the idler, a low gear engaging the reverse gear, a final drive, and a low gear drive path including the idler, the forward, reverse and low gears and the final drive.

13 Claims, 4 Drawing Sheets

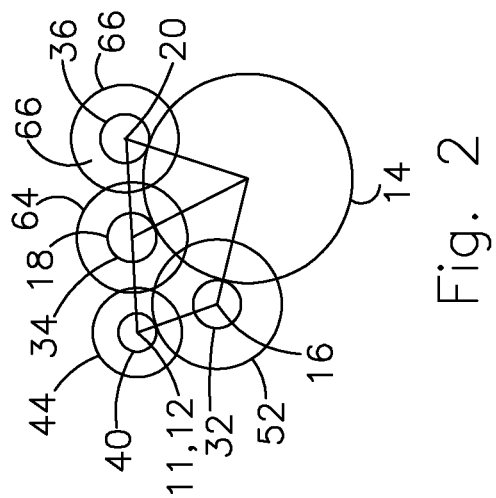
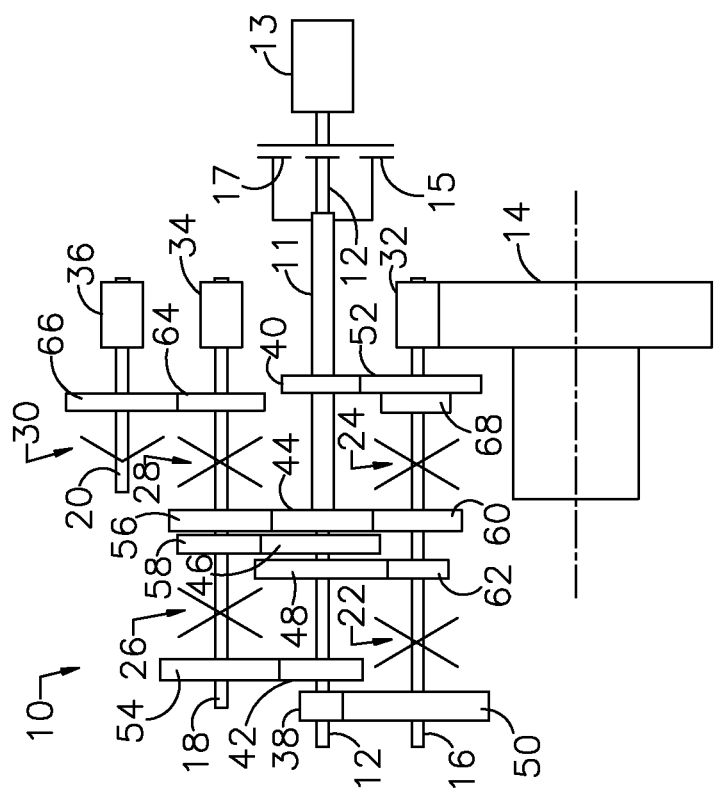

TRANSMISSION HAVING A LOW LAUNCH GEAR

BACKGROUND OF THE INVENTION

1. Field of the Invention

This invention relates generally to a powertrain for a motor vehicle, and, in particular, to the kinematic arrangement for a powershift transmission.

2. Description of the Prior Art

A dual clutch transmission (DCT), also called a powershift transmission, is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with certain gears; the other input clutch transmits torque between the transmission input and a second layshaft associated with the other gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

A powershift transmission launches the vehicle from a stopped or nearly stopped condition using a start clutch. Due to engine downsizing and boosting for a given vehicle size, boost is not present at launch causing potentially insufficient transmission gear ratio for launching.

A powershift transmission generally has a specific number of gears and provides little design flexibility for accommodating an increase in the number of gears to five, six or seven speeds.

A powershift transmission also has complex electro-hydraulic controls to accommodate required synchronizer states. Some designs have relied on multiplexing clutch controls with synchronizer control in an attempt to deduce cost, which results in reduced operating performance, such as longer shift period, loss of repeatable high quality shifts, and an increased number of failure states.

SUMMARY OF THE INVENTION

Gearing for a vehicle transmission includes meshing forward gears and an idler gear connected to a forward gear, a reverse gear engaging the idler gear, a low gear engaging the reverse gear, a final drive, and a low gear drive path including the idler, the forward, reverse and low gears and the final drive The gearbox incorporates a low launch gear able to produce a speed ratio greater than 24:1, as compare to a conventional powershift transmission whose lowest gear has a speed ratio of less than 20:1, more typically 16:1 or 18:1

The gearbox preferably produces seven forward speeds and reverse drive in addition to the low launch gear, but it can be converted easily to produce five, six or seven forward speeds and reverse drive with or without the low launch gear.

When the low launch gear is incorporated, the speed ratio of the first gear can be numerically lower than usual, allowing smaller speed ratio steps between adjacent gears or using the span to achieve a larger number of overdrive producing gears.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram of transmission gearing that produces seven forward speed, reverse drive and an low launch gear;

FIG. 2 is a schematic diagram showing an end view of the gearing of FIG. 1;

DESCRIPTION OF THE PREFERRED EMBODIMENT

Figure 4:
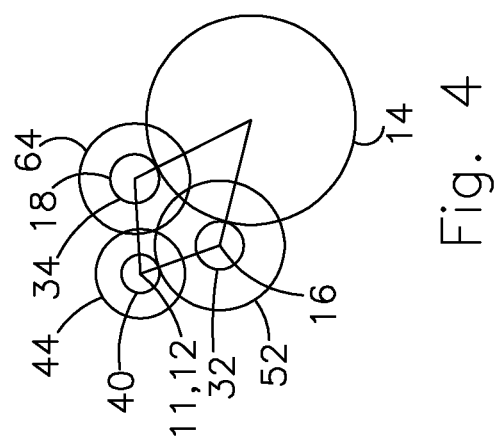
FIG. 4 is a schematic diagram showing an end view of the gearing of FIG. 3.

Referring now to FIG. 1, a powershift transmission 10 includes first and second coaxial input shafts 11, 12, an output gear 14 driveably connected to the vehicle wheels (not shown); first, second and third layshafts 16, 18, 20, respectively; a 1-7 synchronizer 22; a 6-2 synchronizer 24; a 3-5 synchronizer 26; a 4-R synchronizer 28; and a L synchronizer 30. Outer shaft 11 is driveably connected to an engine 13 through an input clutch 15. Inner shaft 12 is driveably connected to the engine through an input clutch 17.

Each layshaft 16, 18, 20 includes an output pinion 32, 34, 36, secured to the respective layshaft. Each synchronizer is secured to the layshaft on which it is supported and includes a selector sleeve having a neutral position from which it is moved axially along the shaft to secure a gear to the shaft. Input clutches 15, 17 include sets of clutch plates, which alternately engage and disengage mutually.

Secured to input shaft 12 are input pinions 38, 42, 46, 48. Secured to input shaft 11 are input pinions 40, 44. First gear 50 meshes with pinion 38 and is journalled on layshaft 16. Second gear 52 meshes with pinion 40 and is journalled on layshaft 16. Third gear 54 meshes with pinion 42 and is journalled on layshaft 18. Fourth gear 56 meshes with pinion 44 and is journalled on layshaft 18. Fifth gear 58 meshes with pinion 46 and is journalled on layshaft 18. Sixth gear 60 meshes with pinion 44 and is journalled on layshaft 16. Seventh gear 62 meshes with pinion 48 and is journalled on layshaft 16. Reverse gear 64 meshes with idler gear 68 and low gear 66 and is journalled on layshaft 18. Low gear 66 is journalled on layshaft 20. An idler gear, secured to second gear 52, is also journalled on layshaft 16 for rotation with gear 52 as a unit.

In operation, each of the gear ratios is produced by transmitting power from the engine 13, through one of the input clutch 15, 17, to the input shaft 11, 12 that corresponds to the desired gear. First gear results when the sector sleeve of synchronizer 22 is moved leftward into engagement with first gear 50 and the selector sleeves of the other synchronizers are in their neutral positions, thereby connecting input shaft 12 to output gear 14 through the mesh between pinion 38 and gear 50, and the mesh between output pinion 32 and output gear 14.

Second gear results when the selector sleeve of synchronizer 24 is moved rightward into engagement with idler 68 and the selector sleeves of the other synchronizers are in their neutral positions, thereby connecting input shaft 11 to output gear 14 through the mesh between pinion 40 and gear 52, and the mesh between output pinion 32 and output gear 14.

Third gear results when the selector sleeve of synchronizer 26 is moved leftward into engagement with third gear 54 and the selector sleeves of the other synchronizers are in their neutral positions, thereby connecting input shaft 12 to output gear 14 through the mesh between pinion 42 and gear 54, and the mesh between output pinion 34 and output gear 14.

Fourth gear results when the selector sleeve of synchronizer 28 is moved leftward into engagement with fourth gear 56 and the selector sleeves of the other synchronizers are in their neutral positions, thereby connecting input shaft 11 to output gear 14 through the mesh between pinion 44 and gear 56, and the mesh between output pinion 32 and output gear 14.

Fifth gear results when the selector sleeve of synchronizer 26 is moved rightward into engagement with fifth gear 58 and the selector sleeves of the other synchronizers are in their neutral positions, thereby connecting input shaft 12 to output gear 14 through the mesh between pinion 46 and gear 58, and the mesh between output pinion 34 and output gear 14.

Sixth gear results when the selector sleeve of synchronizer 24 is moved leftward into engagement with sixth gear 60 and the selector sleeves of the other synchronizers are in their neutral positions, thereby connecting input shaft 11 to output gear 14 through the mesh between pinion 44 and gear 60, and the mesh between output pinion 32 and output gear 14.

Seventh gear results when the selector sleeve of synchronizer 22 is moved rightward into engagement with seventh gear 62 and the selector sleeves of the other synchronizers are in their neutral positions, thereby connecting input shaft 12 to output gear 14 through the mesh between pinion 48 and gear 62, and the mesh between output pinion 32 and output gear 14.

Reverse gear results when the selector sleeve of synchronizer 28 is moved rightward into engagement with reverse gear 64, and the selector sleeves of the other synchronizers are in their neutral positions. The reverse gear power path through transmission 10 includes input shaft 11, pinion 40, second gear 52, idler 68, reverse gear 64, synchronizer 28, layshaft 18, output pinion 34 and output gear 14.

The ultra low or deep low launch gear results when the selector sleeve of synchronizer 30 is moved rightward into engagement with low launch gear 66, and the selector sleeves of the other synchronizers are in their neutral positions. The low gear power path through transmission 10, includes input shaft 11, pinion 40, second gear 52, idler 68, reverse gear 64, low gear 66, synchronizer 30, layshaft 20, output pinion 36 and output gear 14.

The final drive ratio, i.e., the mesh between pinions 32, 34, 36 and gear 14, has a speed ratio of about 4.5. The speed ratio produced in first gear by the mesh between pinion 38 and first gear 50 is about 4.5. Therefore, the first gear speed ratio produced by transmission 10 is about 20:1 (4.5×4.5). In low gear, however, transmission 10 produces a speed ratio, which is the result of a forward gear ratio (2nd gear), a reverse ratio, a low gear ratio and the final drive ratio (4.5). Therefore, a speed ratio of 20:1 is no longer a limit; instead speed ratios much greater than 20:1, e.g. speed ratios greater than 24:1, can be easily produced by transmission 10.

The gearbox preferably produces seven forward speeds and reverse drive in addition to the ultra low gear, but it can be converted easily to produce five, six or seven forward speeds and reverse drive with or without the low launch gear.

Figure 3:
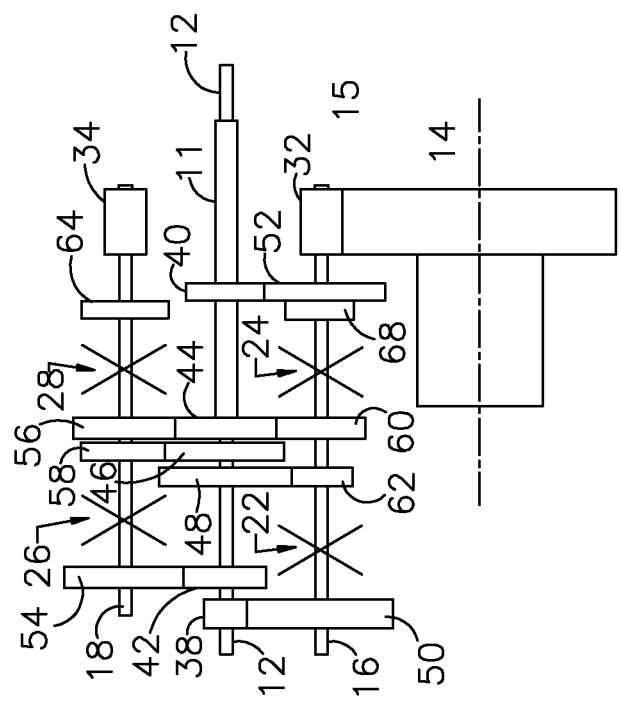
FIG. 3 is a schematic diagram of transmission gearing that produces seven forward speeds and reverse drive.

FIGS. 3 and 4 are schematic diagrams, with the input clutches 15, 17 removed, showing transmission gearing that produces seven forward speeds and reverse drive, by simply deleting from the gearing of FIG. 1 low gear 66, layshaft 20, synchronizer 30, and the output pinion 36. The transmission of FIGS. 3 and 4 operates substantially the same as described with reference to the gearing of FIGS. 1 and 2, except for the low launch gear.

Figure 6:
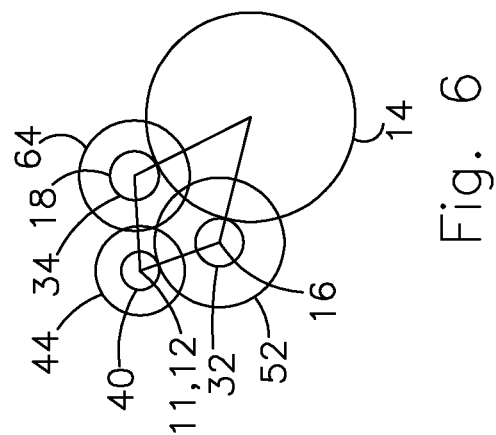
FIG. 6 is a schematic diagram showing an end view of the gearing of FIG. 5.
Figure 5:
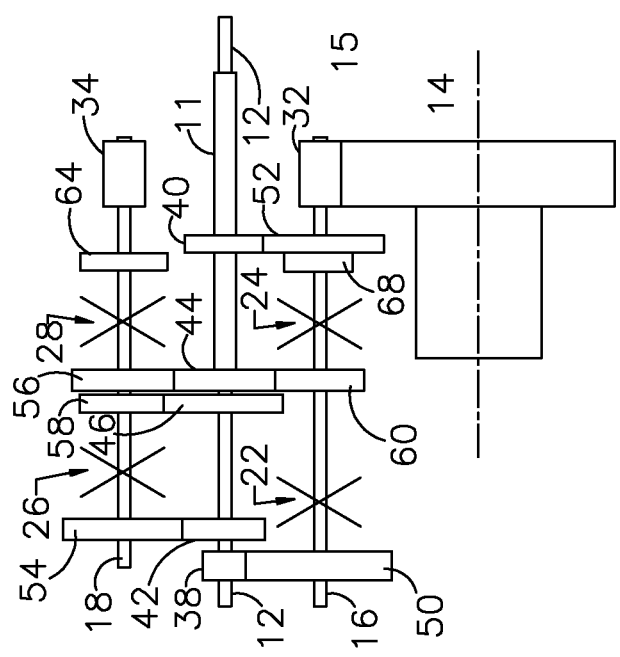
FIG. 5 is a schematic diagram of transmission gearing that produces six forward speeds and reverse drive.

FIGS. 5 and 6 are schematic diagrams, with the input clutches 15, 17 removed, showing transmission gearing that produces six forward speeds and reverse drive, by deleting from the gearing of FIG. 3, seventh gear 62 and pinion 48 and the portion of synchronizer 22 that engaged seventh gear 62. The transmission of FIGS. 5 and 6 operates substantially the same as described with reference to the gearing of FIGS. 1 and 2, except for seventh gear and the low launch gear.

Figure 8:
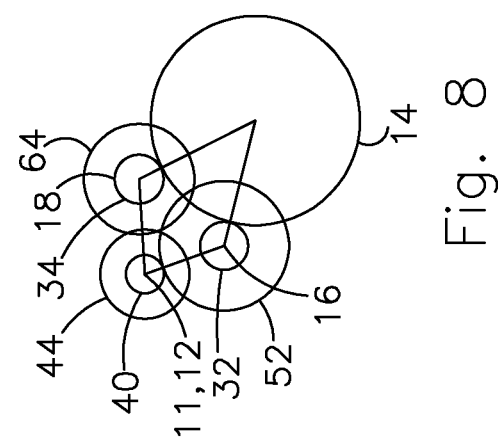
FIG. 8 is a schematic diagram showing an end view of the gearing of FIG. 7.
Figure 7:
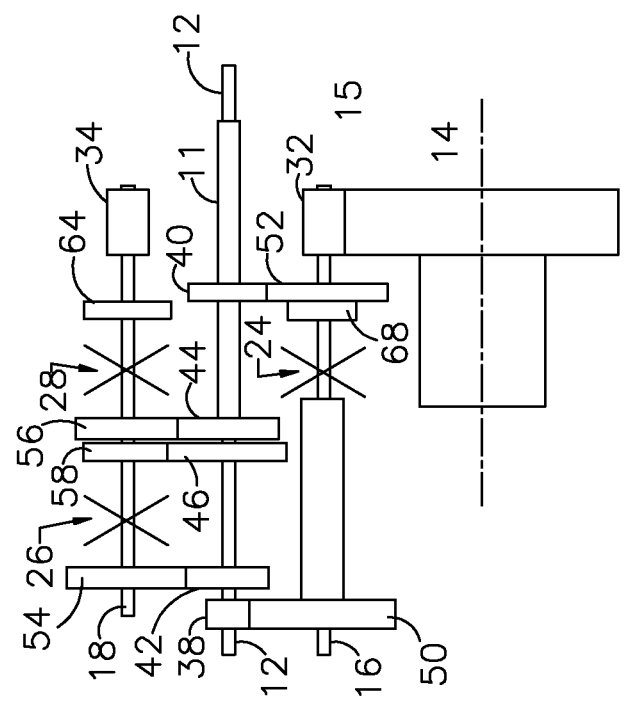
FIG. 7 is a schematic diagram of transmission gearing that produces five forward speeds and reverse drive.

FIGS. 7 and 8 are schematic diagrams, with the input clutches 15, 17 removed, showing transmission gearing that produces five forward speeds and reverse drive, by deleting from the gearing of FIG. 5 sixth gear 60, and synchronizer 22. The transmission of FIGS. 7 and 8 operates substantially the same as described with reference to the gearing of FIGS. 1 and 2, except for sixth gear, seventh gear and low launch gear.

The low launch gear can be incorporated in the gearing of FIGS. 5 and 7 by incorporating low gear 66 meshing with reverse gear 64, layshaft 20 supporting low gear 66, synchronizer 30 for coupling low gear 66 to layshaft 20, and the output pinion 36 meshing with the output 14.

Although the transmission has been described with reference to synchronizers 22, 24, 26, 28, 30, the synchronizers can be replaced by clutch couplers for connecting a layshaft to a gear selected for engagement to the respective layshaft.

In accordance with the provisions of the patent statutes, the preferred embodiment has been described. However, it should be noted that the alternate embodiments can be practiced otherwise than as specifically illustrated and described.

The invention claimed is:

1. A vehicle transmission, comprising:
a second speed pinion secured to an input shaft;
second speed gear meshing with the pinion;
idler secured to the second speed gear;
a reverse gear meshing with the idler;
a low gear producing a speed ratio greater than a speed ratio of a first gear, supported on a layshaft and meshing with the reverse gear;
a coupler connecting the low gear to the layshaft.

2. The transmission of claim 1, further comprising:
a first layshaft supporting the idler and the gear;
a first coupler secured to the first layshaft for connecting the idler to the first layshaft;
a second layshaft supporting the reverse gear thereon;
a second coupler secured to the second layshaft for alternately releasing and connecting the reverse gear to the second layshaft.

3. The transmission of claim 1, further comprising:
a first layshaft;
a first coupler secured to the first layshaft for releasably connecting the idler to the first layshaft;
a second layshaft;

a second coupler secured to the second layshaft for releasably connecting the reverse gear to the second layshaft;
a final drive pinion secured to the layshaft.

4. The transmission of claim 1, further comprising:
a first clutch for connecting and releasing a drive connection between the input shaft and a power source.

5. A vehicle transmission, comprising:
an input shaft;
an output;
a pinion secured to the input shaft;
a gear meshing with the pinion and driving the output at a forward speed;
an idler secured to the gear;
a reverse gear meshing with the idler;
a low gear meshing with the reverse gear and driving the output at a speed ratio greater than a speed ratio of a first forward gear.

6. The transmission of claim 5, further comprising:
a first, second and third layshafts, the gear and idler supported on the first layshaft;
the reverse gear supported on the second layshaft;
the low gear supported on the third layshaft;
a final drive including a low output pinion secured to the third layshaft and meshing with the output.

7. The transmission of claim 6, further comprising:
a first speed pinion secured to a second input shaft;
a first speed gear meshing with the first speed pinion and supported on the first layshaft;
a first coupler for alternately releasing and connecting the first speed gear to the first layshaft;
the final drive including a first output pinion secured to the first layshaft and meshing with the output.

8. The transmission of claim 6, further comprising:
a third speed pinion and a fifth speed pinion secured to a second input shaft;
a third speed gear meshing with the third speed pinion and supported on the second layshaft;
a fifth speed gear meshing with the fifth speed pinion and supported on the second layshaft;
a second coupler for alternately releasing and connecting the third speed gear and the fifth speed gear to the second layshaft,
the final drive including a second output pinion secured to the second layshaft and meshing with the output.

9. The transmission of claim 6, further comprising:
a fourth speed pinion secured to the first input shaft;
a fourth speed gear meshing with the fourth speed pinion and supported on the second layshaft;
a third coupler for alternately releasing and connecting the fourth speed gear and the reverse gear to the second layshaft;
the final drive including a second output pinion secured to the second layshaft and meshing with the output.

10. The transmission of claim 6, further comprising:
a fourth speed pinion secured to the first input shaft;
a sixth speed gear meshing with the fourth speed pinion and supported on the first layshaft;
a first coupler for alternately releasing and connecting the sixth speed gear and the idler to the first layshaft;
the final drive including a first output pinion secured to the first layshaft and meshing with the output.

11. The transmission of claim 6, further comprising:
a seventh speed pinion secured to a second input shaft;
a seventh speed gear meshing with the seventh speed pinion and supported on the first layshaft;
a fourth coupler for alternately releasing and connecting a first speed gear and the seventh speed gear to the first layshaft;
the final drive including a first output pinion secured to the first layshaft and meshing with the output.

12. A vehicle transmission, comprising:
an input and output;
first, second and third layshafts;
meshing gears of a forward drive path supported on the input and first layshaft,
an idler secured to one of said gears;
a reverse gear engaged with the idler and supported on the second layshaft;
a low gear engaged with the reverse gear and supported on the third layshaft;
a final drive comprising a pinion secured to the third layshaft and meshing with the output.

13. The transmission of claim 12, further comprising:
a first coupler for alternately releasing and securing one of the idler and one of the meshing gears to the first layshaft;
a second coupler for alternately releasing and securing the reverse gear to the second layshaft;
a third coupler for alternately releasing and securing the low gear to the third layshaft.

* * * * *